(12) United States Patent
Plante

(10) Patent No.: US 7,806,087 B2
(45) Date of Patent: *Oct. 5, 2010

(54) CAT TRACK

(75) Inventor: Robin Plante, Sainte-Barbe (CA)

(73) Assignee: Rolf C. Hagen, Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,861

(22) Filed: Jan. 12, 2010

(65) Prior Publication Data

US 2010/0107990 A1    May 6, 2010

Related U.S. Application Data

(63) Continuation of application No. 11/974,234, filed on Oct. 12, 2007, now Pat. No. 7,661,394.

(51) Int. Cl.
A01K 29/00 (2006.01)
A01K 15/02 (2006.01)

(52) U.S. Cl. .................................................. 119/707

(58) Field of Classification Search ................ 119/706, 119/707, 708, 847, 416; 464/444; 482/35; 472/117; 446/168, 431, 444; *A01K 15/00, A01K 15/02, 29/00*
See application file for complete search history.

(56) References Cited

U.S. PATENT DOCUMENTS

| 547,764 | A | 10/1895 | Boyum |
|---|---|---|---|
| 2,862,333 | A | 12/1958 | Gardiol |
| 3,559,637 | A | 2/1971 | Fyanes |
| 3,814,432 | A | 6/1974 | Rose |
| 4,722,299 | A | 2/1988 | Mohr |
| 5,009,193 | A | 4/1991 | Gordon |
| 5,203,733 | A | 4/1993 | Patch et al. |
| D335,553 | S | 5/1993 | Conner |
| 5,269,261 | A | 12/1993 | McCance |
| 5,351,650 | A | 10/1994 | Graves |
| 5,360,214 | A | 11/1994 | Harmen |
| 5,517,945 | A | 5/1996 | Udelle et al. |
| 5,517,948 | A | 5/1996 | Udelle et al. |
| 5,529,017 | A | 6/1996 | Udelle et al. |
| 5,540,187 | A | 7/1996 | Udelle et al. |
| 5,544,623 | A | 8/1996 | Udelle et al. |
| 5,572,955 | A | 11/1996 | Boshears |
| 5,579,725 | A | 12/1996 | Boshears |
| 5,634,435 | A | 6/1997 | Udelle et al. |

(Continued)

FOREIGN PATENT DOCUMENTS

DE        04 009296       12/2004

(Continued)

*Primary Examiner*—Kimberly S Smith
*Assistant Examiner*—Marisa Conlon
(74) *Attorney, Agent, or Firm*—Wolf, Greenfield & Sacks, P.C.

(57) ABSTRACT

A cat track composed of several track sections when attached end-to-end in other than an endless loop has end caps to retain a ball that rolls freely in the track. Assembled, the sections may be used together with a cat scratcher and/or a cat spa or other animal toy to increase the animal's interest. The sections may be made in different shapes but are capable of being connected end-to-end to define a variety of patterns, either as an endless or open (non-continuous) track.

18 Claims, 8 Drawing Sheets

U.S. PATENT DOCUMENTS

| | | |
|---|---|---|
| 5,673,651 A | 10/1997 | Udelle et al. |
| 5,673,652 A | 10/1997 | Witte |
| 5,785,005 A | 7/1998 | Udelle et al. |
| 5,809,938 A | 9/1998 | Baiera et al. |
| 5,870,971 A | 2/1999 | Krietzman et al. |
| 5,875,736 A | 3/1999 | Udelle et al. |
| 5,924,908 A | 7/1999 | O'Heir |
| 6,032,615 A | 3/2000 | Girard |
| 6,536,763 B1 | 3/2003 | Braun |
| 6,945,195 B1 | 9/2005 | Morrison |
| 7,661,394 B2 * | 2/2010 | Plante ........................ 119/707 |

FOREIGN PATENT DOCUMENTS

| | | |
|---|---|---|
| GB | 2410199 | 7/2005 |

* cited by examiner

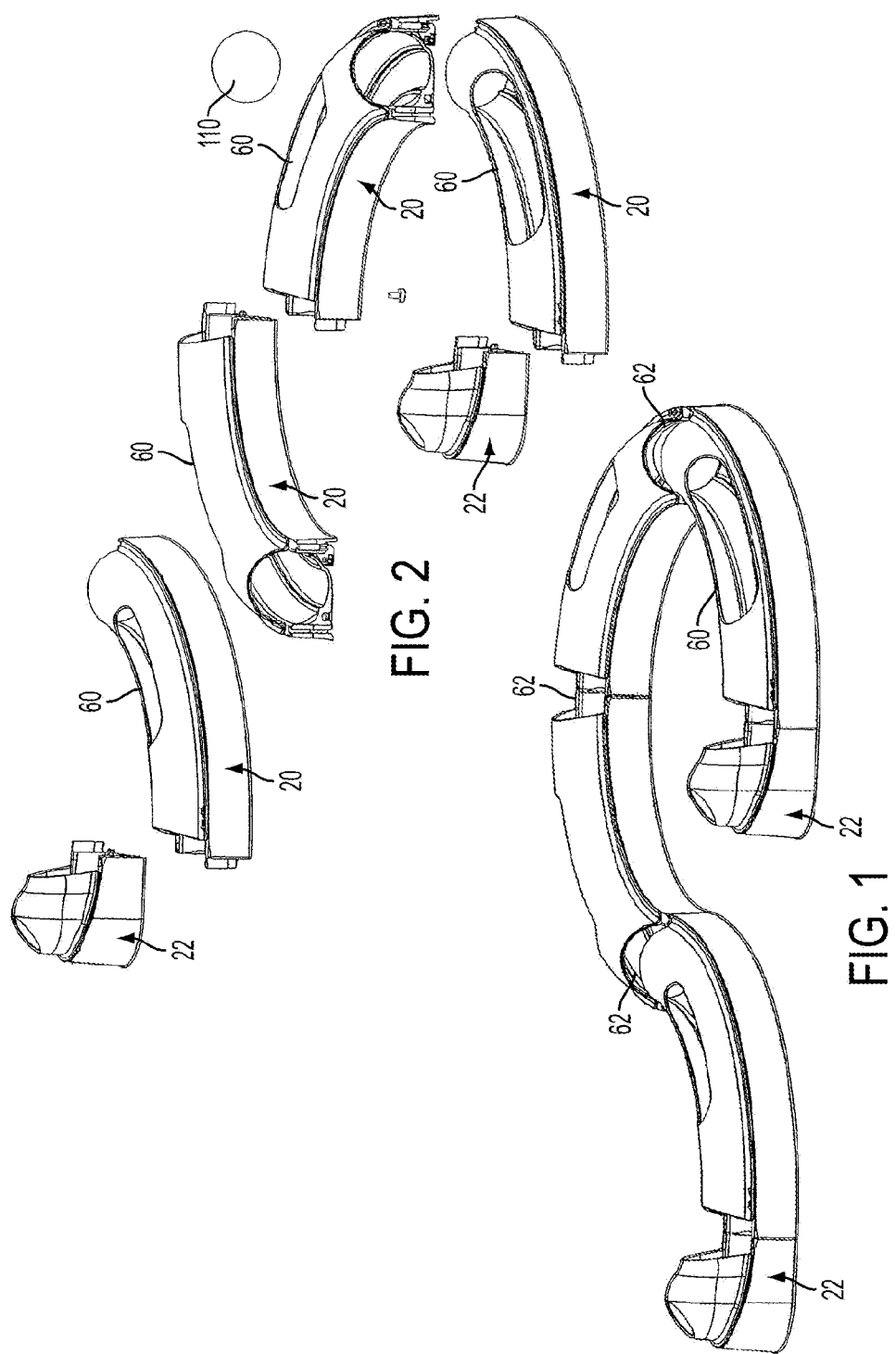

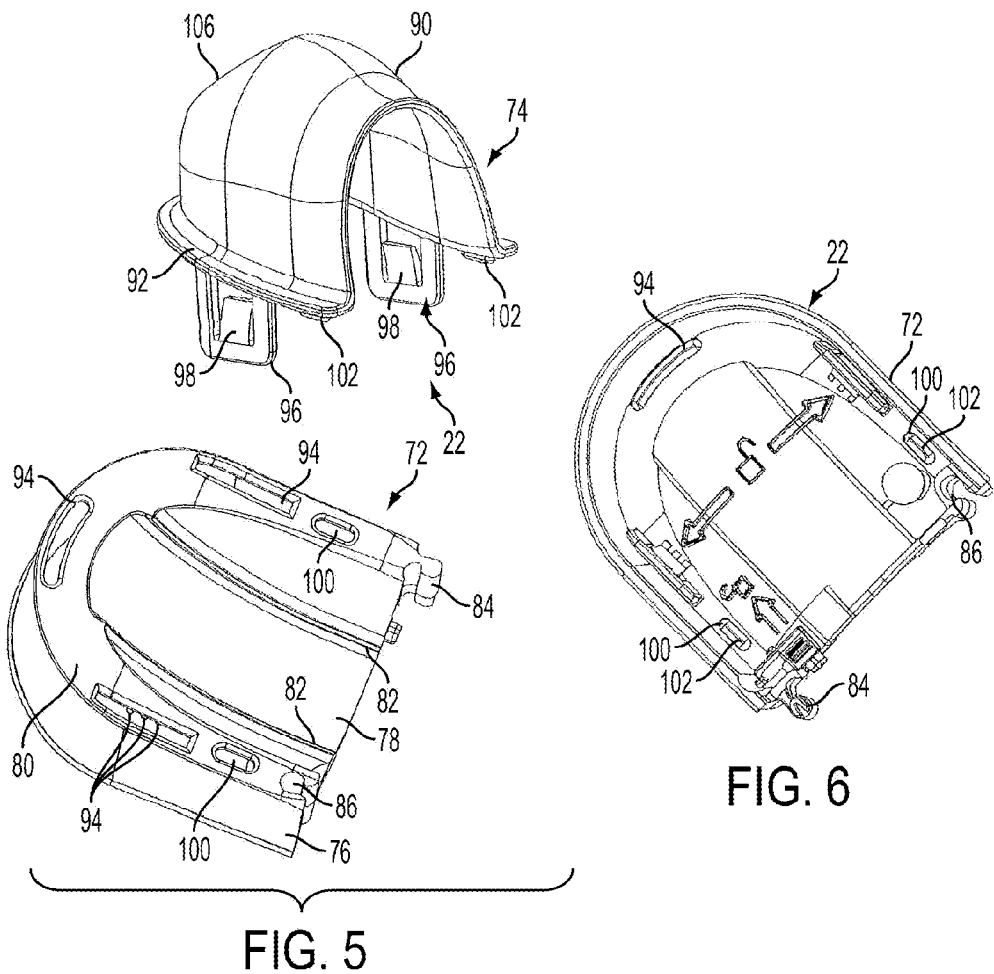
FIG. 5
FIG. 6
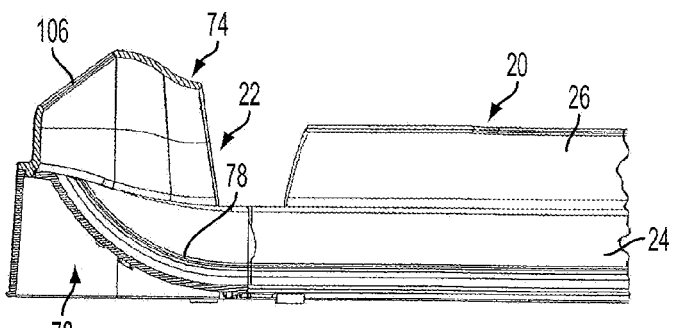
FIG. 7

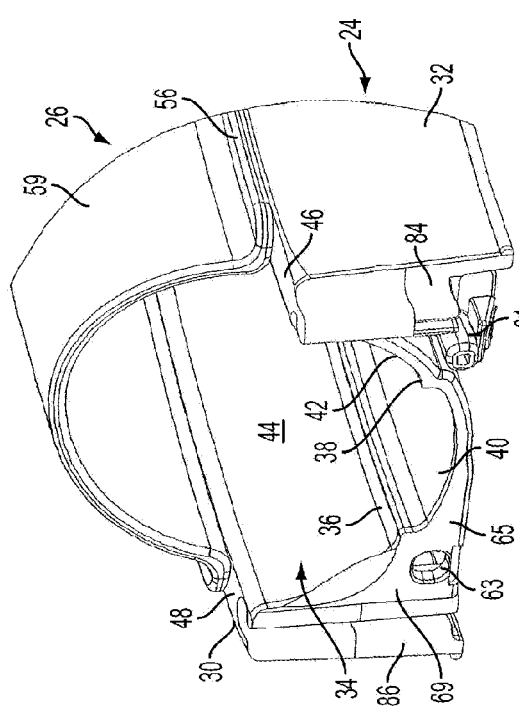
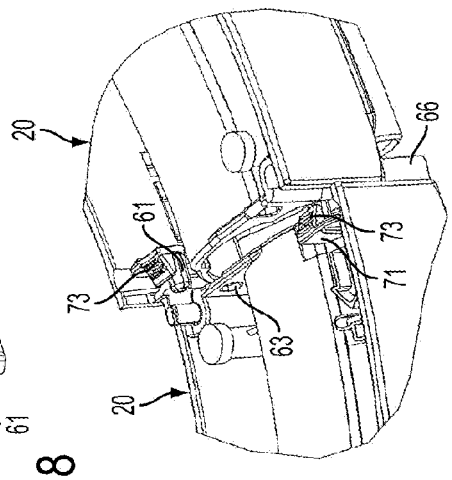
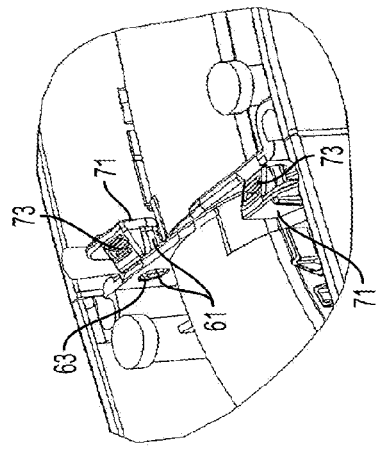

CAT TRACK

RELATED APPLICATIONS

This Application claims the benefit under 35 U.S.C. §120 of U.S. application Ser. No. 11/974,234, entitled "CAT TRACK" filed on Oct. 12, 2007, which is herein incorporated by reference in its entirety.

FIELD OF INVENTION

This invention relates to cat toys and more particularly to a new and improved cat track capable of being assembled in many different patterns and in combination with other activity centers so as to provide greater pleasure to the cat and hold the animal's interest.

BACKGROUND OF INVENTION

It is well known that cats easily get bored playing with the same toy, and one important object of this invention is to provide a track that may be assembled in many different configurations so as to provide a number of different challenges to the animal to hold its attention.

In accordance with one aspect of the invention the track when assembled in other than as an endless track, has a feature that returns a ball rolling freely in the track to a central location intermediate the track ends.

In accordance with another aspect of the invention, the track is of modular construction to enable each length of track to be disassembled for cleaning.

Yet another aspect of this invention is the ability to assemble the track sections with other cat toys such as a spa and scratcher to form an activity center for an animal.

The cat track of the present invention is composed of several sections that may be linear, curved or of other shapes, and the sections may all be the same or of different configurations. Each track section in accordance with one embodiment of the invention is made up of a base that includes an approximately semi-cylindrical track bottom wall and a similarly curved top wall that serves as a cover. The cover has an elongated opening that extends along a substantial portion of the track section length and is large enough to expose a ball moving in the track over a substantial length, but too small to enable the ball to escape from the track. The cover is also shorter in length than the track bottom, and when an assembled section is attached end-to-end with other track sections or track ends, the shorter covers of the adjacent sections also expose the ball, but the openings are not so large as to enable the ball to escape. The openings at each end of the track sections and in the covers enable the cat to push the ball causing it to roll in the track.

In accordance with another aspect of the invention, the assembly includes end caps that may be used with one or more track section connected end-to-end. The track end caps have tracks that are upwardly inclined from the track sections so as to cause a ball in the track that rolls into an end, to reverse direction and roll toward the other end of the track without further pushing by the animal.

In accordance with yet another aspect of the invention, the track sections may be connected to other toys as an assembly, of interest to the animal. Examples of such toys are a cat spa and scratcher.

The invention will be better understood and appreciated from the following detailed description read in connection with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is a perspective view of one track assembly employing four track sections and two end caps in accordance with the present invention;

FIG. 2 is an exploded perspective view of the assembly shown in FIG. 1;

FIG. 5 is an exploded perspective view of an end cap used in the track assembly;

FIG. 6 is a bottom view of the base of the end cap;

FIG. 7 is a cross-sectional elevation view of an assembled end cap and track section;

FIG. 8 is a fragmentary perspective view of one end of an assembled track section;

FIGS. 9 and 10 are fragmentary bottom perspective views of the connection of a track section and an end cap or second track section and showing how the two are attached and releasably locked to one another;

DETAILED DESCRIPTION OF INVENTION

Figure 2A:
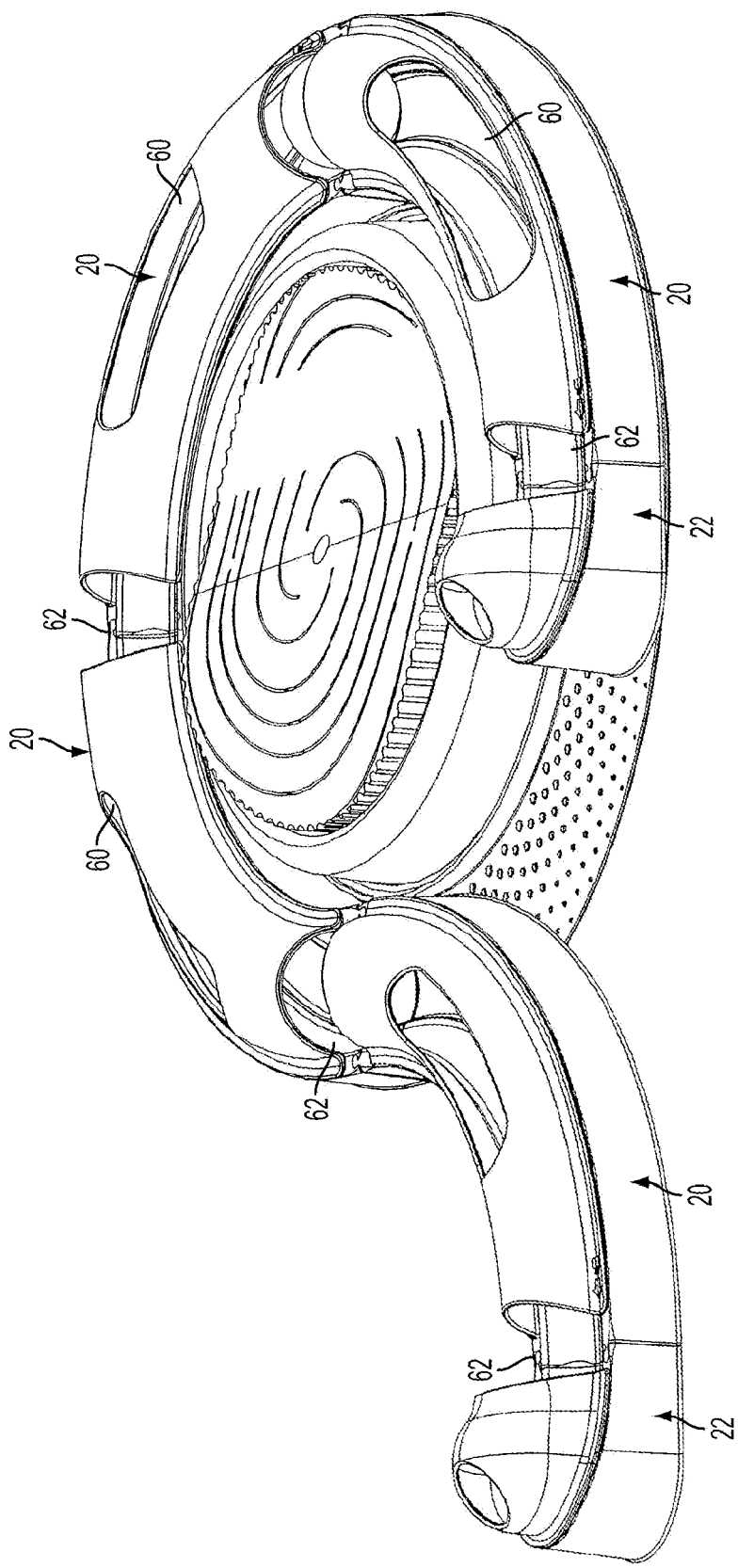
FIG. 2A is a perspective view of a fully assembled cat track system in the configuration of the assembly shown in FIG. 1 with the addition of a cat scratcher incorporated into the system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The modular cat track system of the present invention is composed of a number of track sections 20 as shown in FIGS. 1 and 2 that are capable of being interconnected in a variety of different arrangements, all of which are designed to receive a ball that may roll from end-to-end when the track sections are connected in series or to roll endlessly in a closed loop track when the sections are assembled in an endless array. In addition to the track sections 20, the assembly may include end caps 22 when the track sections are not assembled to form an endless track. It is contemplated that the track sections and end caps 20 and 22 may be sold as a kit containing a plurality of track sections and two or more end caps, but it is to be appreciated that the sections and caps may be packaged and sold individually so as to expand the number and size of previously acquired track systems, all constructed in accordance with the invention. It is also contemplated that the cat track kit may include one or more scratch pads 120 and/or grooming stations 130, hereinafter called cat spa, that may be incorporated into a chosen assembly of several track sections with or without end caps. In FIGS. 11-16 a variety of different track assemblies are shown by way of examples, made of track sections, with or without end caps, scratch pads and grooming stations.

The ball 110 used in the track system may be molded or otherwise formed of polypropylene and preferably is made of contrasting colors. For example, the ball may appear to have two halves of different color. Alternatively, the colors may form a spattered pattern or other design, and one or both colors may be reflective. This feature will create an object when in motion that provides more visual movement to attract the cat to continue to play with the ball.

In FIGS. 3-10, the several details of a single track section and connected sections are illustrated. A single track section (see FIG. 3) is composed of a base 24 and cover 26, each molded of a plastic material such as polypropylene that is rugged enough to withstand the stresses to which they may be subjected by children who use the track system while playing with their pet animals and/or the stress imposed upon them by the animals themselves. While polypropylene is preferred, other plastics such as polyethylene, polycarbonate, polystyrene or abs may be used. The base and cover of each section are designed to be manually coupled together and detached from one another without the aid of any tools.

Figure 11:
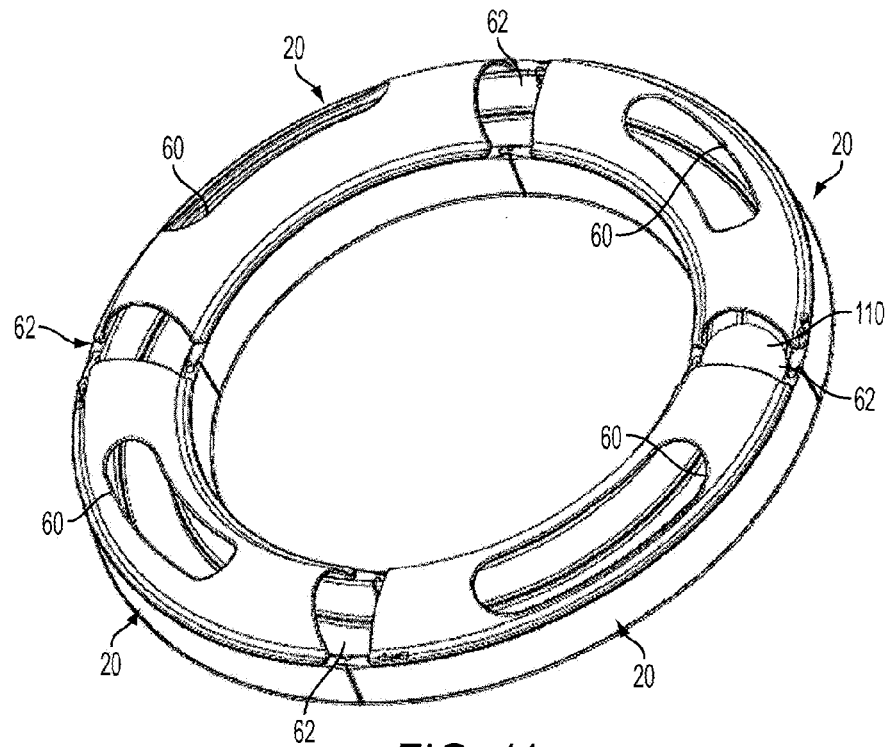
FIG. 11 is a perspective view showing one track assembly composed of four track sections assembled to form an endless track.

In the embodiment illustrated, each track section is arcuate in shape and extends through a course of 90° with a constant radius so that four such track sections may, for example, be connected as a circular track (see FIG. 11). It should be appreciated however, that the track sections may be of a different curvature and different numbers of sections may be required to achieve particular track configurations. Moreover, a single kit may contain track sections of a variety of shapes.

In the embodiment shown, the base 24 has a radially outer wall 30, a radially inner wall 32, and an intermediate generally U-shaped trough 34, that may be molded together as a unitized structure. As shown in FIG. 8, the U-shaped trough 34 that defines the lower portion of the ball track is formed with a pair of rails 36 and 38. The bottom and inner and outer side portions 40, 42, and 44 of the trough 34 preferably do not make contact with the ball when it rolls through the track section to minimize friction. Upper inner and outer rims 46 and 48 of the track base 24 join the tops of the inner and outer walls 42 and 44 of the trough 34 with the inner and outer walls 32 and 30 and have flat surfaces that provide a seat for the lower inner and outer flanges 56 of the cover 26 of the track section 20. The track cover 26 in the embodiment shown has a curved hood 59 of generally constant radius between the flanges 56.

Figure 4:
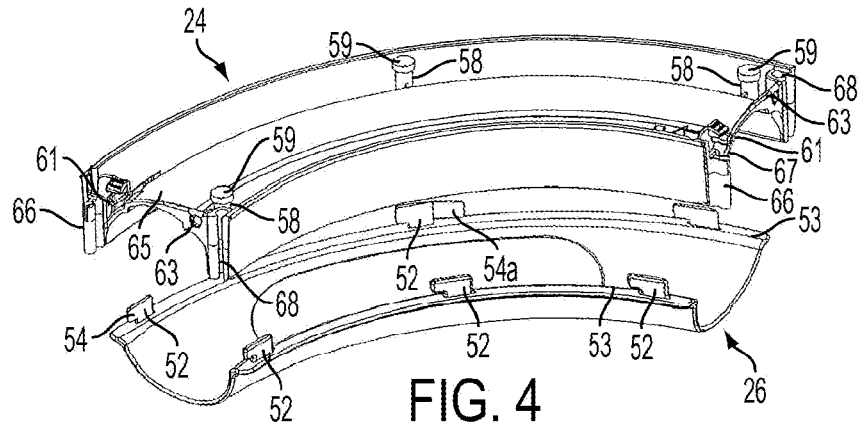
FIG. 4 is an exploded bottom perspective view of the track section shown in FIG. 3.
Figure 4A:
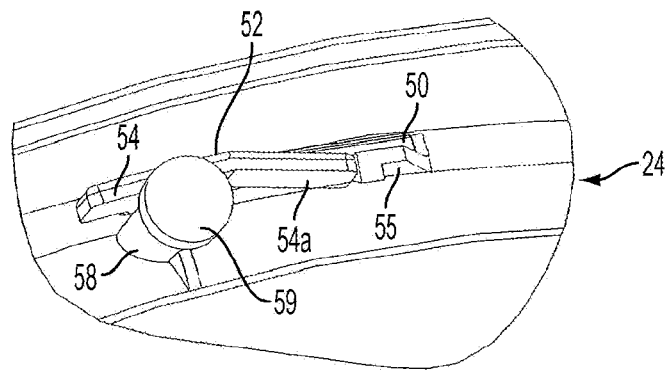
FIG. 4A is an enlarged fragmentary bottom perspective view of the base of the track section showing an interlock that joins the base and top of the section together.
Figure 3:
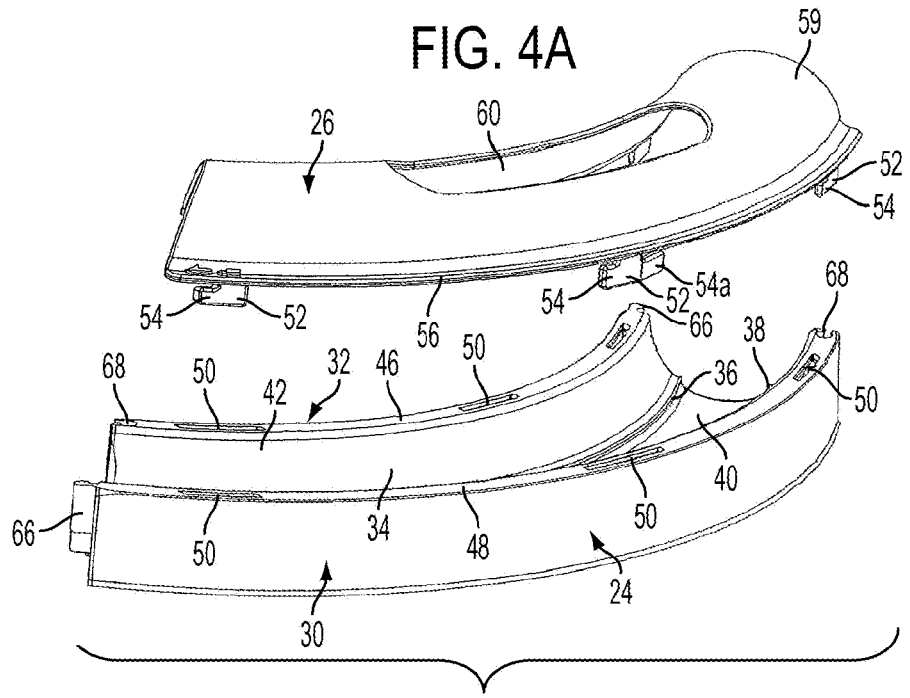
FIG. 3 is an exploded perspective view of one track section.

The rims 46 and 48 are provided with spaced slots 50 (see FIG. 3) that receive the locking tabs 52 carried on the lower sides 53 of the track cover flanges 56. The locking tabs have one or more wings 54 that are spaced below the lower surfaces 53 of flanges 56 of the cover so as to underlie the rims 46 and 48 of the base to lock the base and cover together. Other fasteners may be used for that purpose, but the illustrated arrangement is preferred. In FIGS. 3, 4, and 4A one of the locking tabs 52 has a wing 54*a* that is offset so as to be biased to a position to lie behind a catch 55 adjacent the corresponding slot 50 in the track base 24 when the cover and base are assembled so that the two will not turn relative to one another and accidentally separate. To separate the cover and base, the wing 54*a* must be displaced out of alignment with the stop 55 and into alignment with its slot 50. It should be appreciated that this latching arrangement is preferred, but other types of catch-like devices may be used.

As shown in FIGS. 4 and 4A, the track base may be provided with spaced apart feet 58 which carry pads 59 to support the base on a surface such as the floor. The pads 59 may be employed to protect the surface and also prevent the track section or an assembly of tracks from sliding on the floor.

Track sections are connected together end-to-end by the posts 66 and sleeves 68 formed on the ends of the inner and outer walls 32 and 30 and trough side walls 42 and 44 of each base section. It should be noted (see FIG. 3) that the location of the posts and sleeves at the opposite ends of a single section of the track are reversed. When the posts 66 and slots 68 of adjacent track sections are connected together, they interlock with one another by the releasable fasteners shown in FIGS. 8-10. In FIGS. 4 and 8-10, a peg 61 and opening 63 are shown provided on opposite sides of ends 65 of the base 24 of track section 20. On opposite ends of each base 24 the sides of the peg 61 and opening 63 are reversed, like the posts 66 and slots 68. The openings 63 are disposed in walls 69 while the pegs 61 are carried on flexible fingers 71. When the ends of adjacent track sections are interconnected by a post 66 and slot 68 and the bottoms of the two sections are coplanar, the pegs 61 will enter the facing opening 63 to releasably lock the two track sections together. To separate the two sections, fingers 71 must be deflected so as to withdraw the pegs 61 carried by the fingers from the openings 63, and thereafter the posts 66 may be slipped out of the slots 68. Grips 73 are provided on the free ends of each of the fingers 71 to assist in deflecting them so as to withdraw the page 61 from the openings 63. This arrangement for attaching track sections together imparts sufficient stiffness to an array of connected tracks so as to enable them to be lifted with one hand grasping the assembly at any chosen location.

Each track section cover 26 includes an elongated opening 60 that enables a cat to engage and propel a ball disposed in the track. However, the openings 60 are sized to prohibit a ball from escaping from the track through them. As shown in FIGS. 1, 2 and 2A, the cover 26 is somewhat shorter in length than the base 24 so as to define additional openings 62 for exposing a ball in the track when two track sections are connected together. The openings 62 between the ends of adjacent covers 26 are also too small to allow a ball to escape from the tracks.

The cat track system when assembled may also include one or more end caps 22 shown in FIGS. 1, 2, and 5-7. Each end cap includes a base 72 and cover 74 that have many similarities to the base and cover of the track section 20. However, the end caps 22 are not configured to allow a ball to roll through them, but rather the end caps are designed to cause the ball to reverse direction, that is, to roll without assistance back into the track sections through which the ball was delivered to the end cap. This is achieved by providing the end caps with an inclined roll path.

The base 72 has a peripheral side wall 76 and an inner trough 78 joined together by the top wall 80 (see FIG. 5). Like the trough 34 in the track base 24, the trough 78 has parallel ribs 82 on which the ball rolls with minimum friction. The base of the end cap also includes a post 84 and sleeve 86 that are functionally identical to the posts and sleeves on the ends of the base of each track section. By means of the posts and sleeves, the end sections can be connected to either end of any of the track sections. The cover 74 of the end cap which is configured to sit on the top wall 80 of the base 72 has a hood 90 and a rim 92, the rim 92 sitting on the top wall 80 of the base when the two are assembled. The base 72 and cover 74 are releasably connected together by means of slots 94 in the top wall 80 of the base and tongues 96 on the rim 92 of the cover. In FIG. 5 it will be noted that each tongue 96 is U-shaped and carries a flange 98 that engages ribs 94 disposed on the bottom of the top wall 80 of the base 72 adjacent slots 94 so as to hold the base 72 and cover 74 together. The cover may be separated from the base by manually deflecting the flanges 98 to release the ribs 94 and align the flanges with the slots 94. In the embodiment shown in FIG. 5, the top wall 80 of the base also includes a pair of slots 100 that receive small flanges 102 on the lower side of the rim 92 of the cover to precisely align the base and cover.

To provide additional access to the track and more particularly a ball on it, an opening 106 is formed in the dome 90 of the cover aligned with the track end defined by the trough 78. Like the other openings in the track section, opening 106 is too small to enable a ball to escape from the track. Sections of track and end caps may be connected together in a variety of different forms so as to expand the cat's interest in the track as a toy. The different configurations shown include four or more identical track sections 20 but it is to be appreciated that a fewer number of track sections may be used. For example, a single track section 20 combined with end caps 22 at both ends is a fully operative track system as well. The track systems in the embodiments shown are used with a ball, preferably made of two contrasting colors 110, which when in motion provides more visual movement to attract a cat to play.

In FIG. 11 an endless track configuration is shown composed of four track sections 20. A ball 110 as described above would be placed in the track before the track assembly is fully connected. When the assembly is complete, the ball cannot escape. The openings 60 in the top wall of each track section and the openings 62 between the ends of adjacent track section covers enable the ball 110 in the track to be engaged and pushed along by a cat, but the ball will remain in the assembly.

Figure 12:
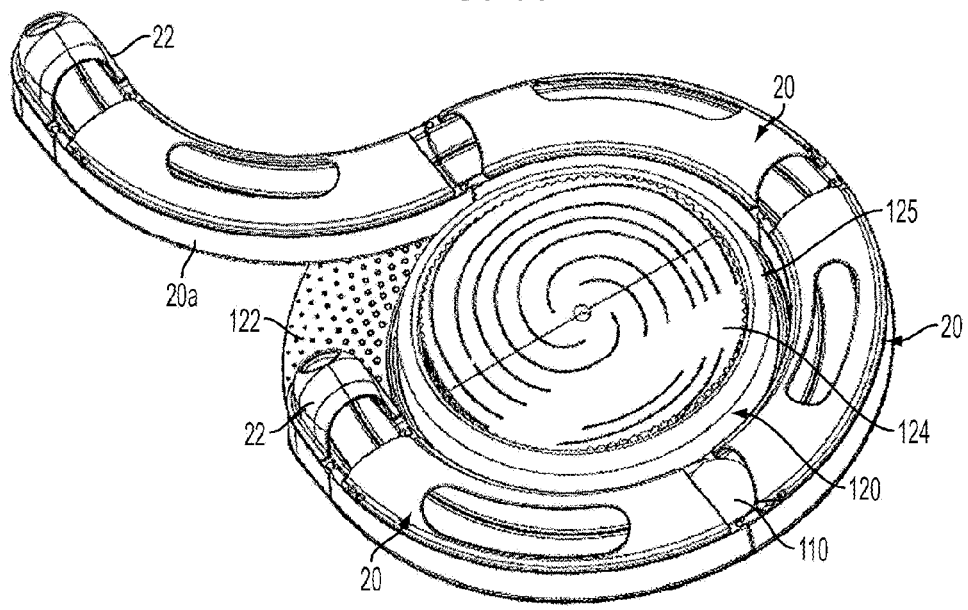
FIGS. 12-16 show five additional track configurations together with a cat grooming and/or scratch station.

In FIG. 12, three track sections 20 are assembled to define a 270° continuous curve, and a fourth track section 20a that may be identical to the others is assembled in reverse curvature extending away from the other sections so as not to form an endless track. The caps 22 are connected to the ends of the combined four tracks. Once assembled with a ball in the track, the ball cannot fall out of the assembly, but the ball may be propelled from end-to-end through the openings 60 and 62 and the inclined tracks in the end caps will reverse the direction of the ball. In this assembly a cat scratcher 120 is added to the track to create additional interest for the animal. The scratcher includes a carpet 122 that may have an array of bumps on its lower surface (not shown) so as to hold the assembly in fixed position on the floor or other surface on which the assembly is used. The upper surface of the scratcher may also have an array of bumps to resist the track segments from shifting on the carpet surface. The carpet preferably is made of a soft, flexible elastomer such as polypropylene. The flexible material enables the carpet to be folded to reduce packaging and storage size. The cat scratcher 120 shown also includes a cardboard insert 124 that has a swirled rib on its upper surface and ribs on its edges, and the insert 124 is held in place by base 125 that surrounds it. It should be appreciated that the scratcher may take other forms and be made of other materials as well. An important advantage of the scratcher 120 is that it fits within and conforms in size to the curvature of the track assembly and becomes an integral part of the pet toy.

Figure 13:
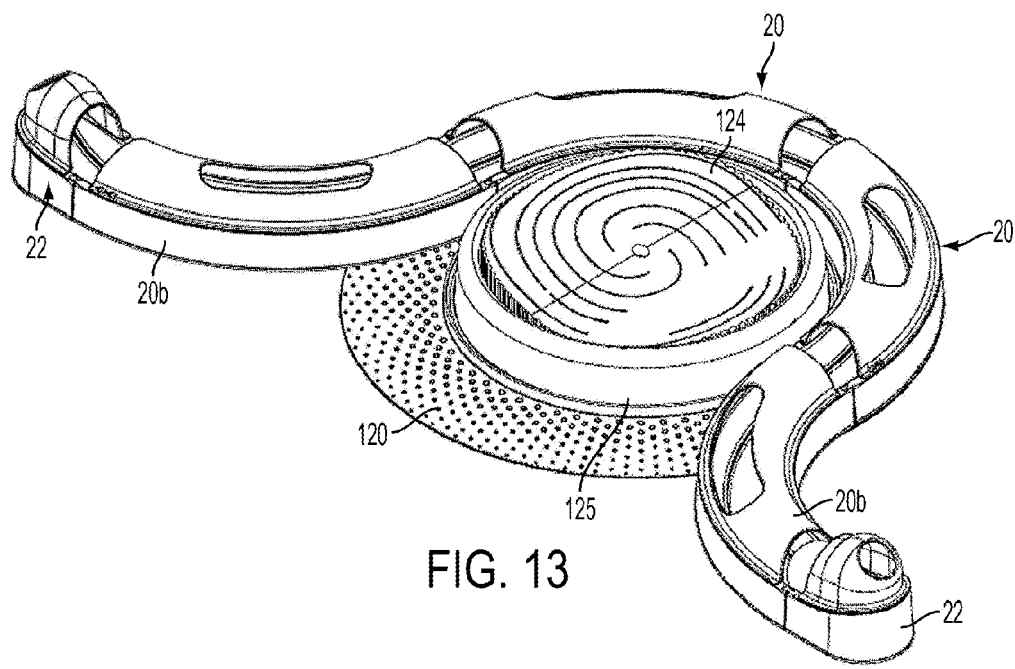

FIG. 13 shows yet a different track configuration with two track sections 20 forming a 180° semi-circular portion with additional track sections 20b connected to end of the semi-circular array, and with the free ends of the U-shaped track closed by end caps 22. Again, a cat scratcher 120 is disposed within and partially surrounded by half the assembled track.

Figure 14:
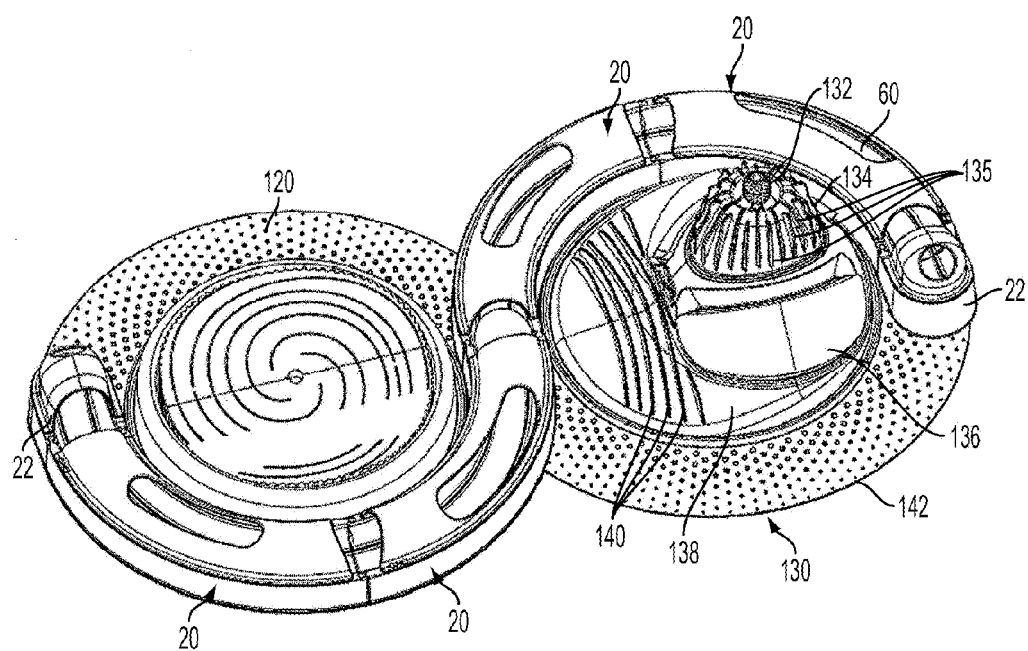

FIG. 14 illustrates yet another track assembly in an S-configuration and with one half of the track assembly disposed at the margin of a cat scratcher 120 like those shown in FIGS. 12 and 13, and a cat spa 130 partially surrounded by the other half of the track assembly. The ends of the assembly include end caps 22 to confine the ball within the track. The spa shown includes a gum stimulator 132 carried on a cone 134 having cat rubbing ribs 135, a pair of brushes 136, a base 138 with cat rubbing ribs 140, and a carpet 142. This configuration provides additional interest for the cat.

Figure 15:
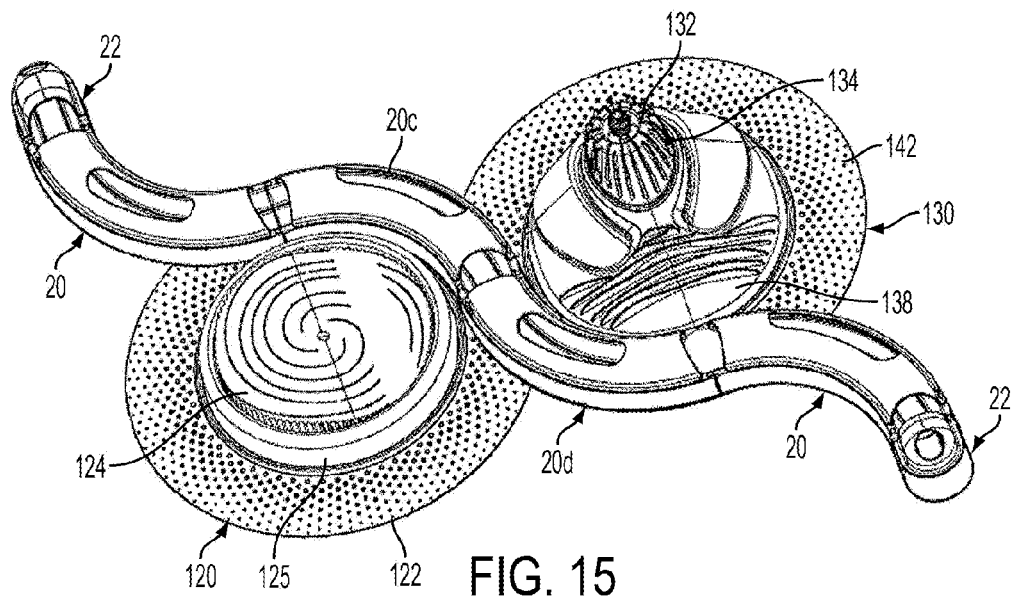
Figure 16:
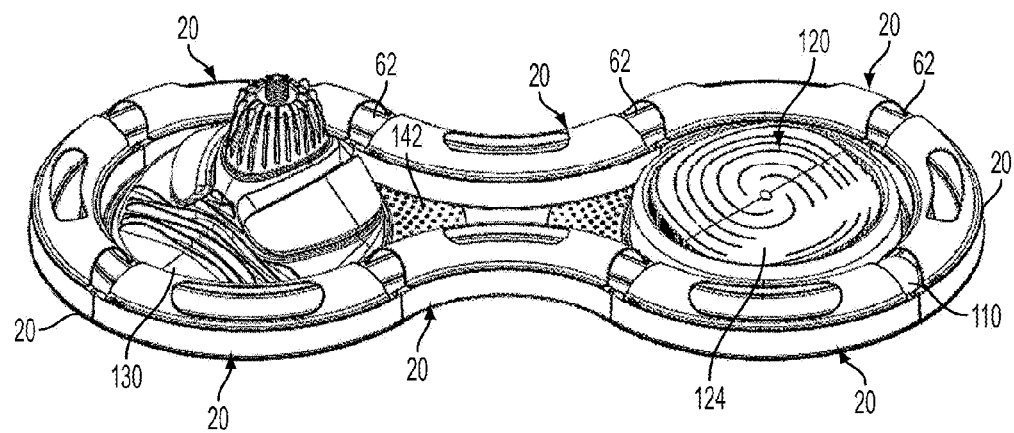

The track assembly of FIG. 15 is similar to that of FIG. 14 but the curvature of successive track sections 20 is reversed to form a lazy double S-shape. A scratcher 120 and spa 130 are separated by the middle two track sections 20c and 20d. FIG. 16 shows the track assembly made up of eight track sections 20 in a figure eight configuration. The loops of the figure eight assembly separately surround a scratcher 120 and cat spa 130 like those shown in FIGS. 12-15.

It is contemplated that the track sections 20 and end caps 22 may be sold in different numbers and separated from the spa and scratcher that also may be separately sold so that the owner can expand the system to maintain the cat's interest. It is also contemplated that the track sections may be made with different curvatures but be capable of being assembled together to form either a closed loop or track with end caps 22. Moreover, the assembly may include greater numbers of track sections to form different assembly shapes. The configurations shown in FIGS. 11-16 are present by way of examples only, and the invention is not limited to any specific assembly configuration.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A cat track system comprising
    a plurality of tubular track sections having top and bottom portions and sized to receive a ball that may roll through the tubular sections,
    connectors formed on the ends of the plurality of tubular track sections enabling the several sections to be interchangeably joined with one another for forming different track configurations having an elongated ball track,
    at least one opening in the top portion of at least one of the plurality of tubular track section providing access for a cat to the interior of the at least one tubular track section for advancing a ball disposed in the track configuration, said at least one opening being sized to prevent a ball disposed in the assembled track sections from escaping from the track, wherein the top portion of each track section is shorter in length than the bottom portion exposing the ends of each portion and so as to define with the top portion of an adjacent track system an opening enabling a cat to engage a ball and push it along in the track, and
    wherein at least one of the tubular track sections is upwardly inclined to provide an inclined path for the all.

2. The cat track system of claim 1, wherein the plurality of tubular track sections include a plurality of end caps, and the at least one upwardly inclined section is at least one of the end caps.

3. The cat track system of claim 2, wherein each end cap has an opening small enough to retain a ball in the track and large enough to enable a cat to reach a ball in the end cover.

4. The cat track system of claim 2, wherein the end caps have a ball track open to the end of the track section to which it is attached and defining a closure for that end of the track section.

5. The cat track system as defined in claim 4, wherein the ball track in the end cap slopes downwardly to the end of the track in the section to which end cap is attached.

6. The cat track system of claim 1, wherein at least some of the track sections are curved.

7. The cat track system of claim 1, wherein the bottom portion of each section is free of openings.

8. The cat track system of claim 1, wherein each track section is curved and the curvature is of constant radius.

9. The cat track system of claim 1, wherein locking tabs and cooperating slots are provided on the sides of the top and bottom portions of each track section enabling the portions of each section to be detachably connected without tools.

10. The cat track system as defined in claim 1, wherein the ends of each bottom portion of each track section has a pin and slot lock at each end for enabling an assembled array of track sections to be lifted from one end.

11. The cat track system of claim 1, wherein the openings in the top portions of the track sections are elongated and extend longitudinally of the sections.

12. The cat track system as defined in claim 1, wherein the connectors are integrally formed on the ends of each track section.

13. The cat track system as defined in claim 1, wherein the top portion is separable from the bottom portion.

14. A cat track system comprising:
a plurality of tubular track sections having top and bottom portions and sized to receive a ball that may roll through the tubular sections, the plurality of track sections includes a plurality of end caps;
connectors formed on the ends of the plurality of tubular track sections enabling the several sections to be interchangeably joined end-to-end with one another for forming different track configurations having an elongated ball track;
at least one elongated opening in the top portion of at least one of the plurality of tubular track sections and providing access for a cat to the interior of the track sections for advancing a ball disposed in the track configuration, said at least one elongated opening being sized to prevent a ball disposed in any of the assembled track sections from escaping from the track; wherein the top portion of each track section is shorter in length than the bottom portion exposing the ends of each portion so as to define with the top portion of an adjacent track section an opening enabling a cat to engage a ball and push it along in the track; and
wherein at least one of the tubular track sections is upwardly inclined to provide an inclined path for the ball.

15. The cat track system of claim 14, wherein each end cap has an opening small enough to retain a ball in the track and large enough to enable a cat to reach a ball in the end cover.

16. The cat track system of claim 14, wherein the bottom portion of the track sections has inner and outer side walls and a U-shaped trough disposed between the side walls and suspended from the top of said side walls.

17. The cat track system of claim 14, wherein the top and bottom portions are separable.

18. The cat track system of claim 14, wherein at least one of the plurality of tubular track sections is curved.

\* \* \* \* \*

UNITED STATES PATENT AND TRADEMARK OFFICE
CERTIFICATE OF CORRECTION

PATENT NO. : 7,806,087 B2  Page 1 of 1
APPLICATION NO. : 12/685861
DATED : October 5, 2010
INVENTOR(S) : Robin Plante It is certified that error appears in the above-identified patent and that said Letters Patent is hereby corrected as shown below:

Column 6, line 63 of claim 1, change "all" to -- ball --.

Signed and Sealed this

Sixteenth Day of November, 2010

David J. Kappos
*Director of the United States Patent and Trademark Office*